(12) United States Patent
Herrmann et al.

(10) Patent No.: US 8,665,177 B2
(45) Date of Patent: Mar. 4, 2014

(54) TOUCH SENSOR FOR CONTROLLING EYEWEAR

(75) Inventors: Frederick P. Herrmann, Sharon, MA (US); John Gassel, Mansfield, MA (US); James Johnston, Newton, MA (US)

(73) Assignee: Kopin Corporation, Westborough, MA (US)

( * ) Notice: Subject to any disclaimer, the term of this patent is extended or adjusted under 35 U.S.C. 154(b) by 215 days.

(21) Appl. No.: 13/022,112

(22) Filed: Feb. 7, 2011

(65) Prior Publication Data

US 2011/0194029 A1 Aug. 11, 2011

Related U.S. Application Data

(60) Provisional application No. 61/301,865, filed on Feb. 5, 2010.

(51) Int. Cl.
*G09G 5/00* (2006.01)

(52) U.S. Cl.
USPC .............................. 345/8; 351/158; 359/630

(58) Field of Classification Search
USPC .................. 345/7–9, 173–183; 178/18.06, 178/18.01–18.11, 19.01–19.07, 178/20.01–20.04; 359/630–633; 351/158
See application file for complete search history.

(56) References Cited

U.S. PATENT DOCUMENTS

| | | | |
|---|---|---|---|
| 3,936,869 A * | 2/1976 | Jirka | 348/648 |
| 5,129,716 A | 7/1992 | Holakovszky et al. | |
| 5,990,793 A | 11/1999 | Bieback | |
| 6,108,197 A | 8/2000 | Janik | |
| 6,124,976 A * | 9/2000 | Miyazaki | 359/630 |
| 6,204,974 B1 | 3/2001 | Spitzer | |
| 6,325,507 B1 | 12/2001 | Jannard et al. | |
| 6,349,001 B1 | 2/2002 | Spitzer | |
| 6,798,391 B2 | 9/2004 | Peterson, III | |
| 6,853,293 B2 | 2/2005 | Swartz et al. | |
| 6,900,777 B1 | 5/2005 | Hebert et al. | |
| 6,922,184 B2 | 7/2005 | Lawrence et al. | |
| 6,956,614 B1 | 10/2005 | Quintana et al. | |
| 6,966,647 B2 | 11/2005 | Jannard et al. | |

(Continued)

FOREIGN PATENT DOCUMENTS

| | | |
|---|---|---|
| WO | WO 95/21408 | 8/1995 |
| WO | WO 95/23994 | 9/1995 |

(Continued)

OTHER PUBLICATIONS

Notification of Transmittal of the International Search Report and the Written Opinion, including copies of International Search Report and Written Opinion; International Application No. PCT/US11/23898, Date of Mailing Mar. 30, 2011.

(Continued)

*Primary Examiner* — Gene W Lee
(74) *Attorney, Agent, or Firm* — Hamilton, Brook, Smith & Reynolds, P.C.

(57) ABSTRACT

Capacitive touch sensors are integrated with a head-mounted display (HMD) device or other video eyewear devices to create a more reliable and more intuitive user interface. The sensors, which may be implemented as an array, control various aspects of a left and right channel multimedia presentation, such as interpupillary distance or stereoscopic convergence, brightness, volume, or power mode.

12 Claims, 8 Drawing Sheets

(56) References Cited

U.S. PATENT DOCUMENTS

| | | |
|---|---|---|
| 7,004,582 B2 | 2/2006 | Jannard et al. |
| 7,082,393 B2 | 7/2006 | Lahr |
| 7,147,324 B2 | 12/2006 | Jannard et al. |
| 7,150,526 B2 | 12/2006 | Jannard et al. |
| 7,213,917 B2 | 5/2007 | Jannard et al. |
| 7,216,973 B2 | 5/2007 | Jannard et al. |
| 7,219,994 B2 | 5/2007 | Jannard et al. |
| 7,249,846 B2 | 7/2007 | Grand et al. |
| 7,278,734 B2 | 10/2007 | Jannard et al. |
| 7,331,666 B2 | 2/2008 | Swab et al. |
| 7,445,332 B2 | 11/2008 | Jannard et al. |
| 7,452,073 B2 | 11/2008 | Jannard et al. |
| 7,461,936 B2 | 12/2008 | Jannard |
| 7,494,216 B2 | 2/2009 | Jannard et al. |
| 7,512,414 B2 | 3/2009 | Jannard et al. |
| 7,682,018 B2 | 3/2010 | Jannard |
| 7,740,353 B2 | 6/2010 | Jannard |
| 7,744,213 B2 | 6/2010 | Jannard et al. |
| 7,753,520 B2 | 7/2010 | Fuziak, Jr. |
| 7,806,525 B2 | 10/2010 | Howell et al. |
| 7,918,556 B2 | 4/2011 | Lewis |
| 7,966,189 B2 | 6/2011 | Le et al. |
| 7,967,433 B2 | 6/2011 | Jannard et al. |
| 7,969,383 B2 | 6/2011 | Eberl et al. |
| 7,969,657 B2 | 6/2011 | Cakmakci et al. |
| 7,988,283 B2 | 8/2011 | Jannard |
| 7,997,723 B2 | 8/2011 | Picnimaa et al. |
| 8,020,989 B2 | 9/2011 | Jannard et al. |
| 8,025,398 B2 | 9/2011 | Jannard |
| 8,072,393 B2 | 12/2011 | Riechel |
| 8,092,011 B2 | 1/2012 | Sugihara et al. |
| 8,098,439 B2 | 1/2012 | Amitai et al. |
| 8,123,352 B2 | 2/2012 | Matsumoto et al. |
| 8,140,197 B2 | 3/2012 | Lapidot et al. |
| 8,144,129 B2 * | 3/2012 | Hotelling et al. ............. 345/174 |
| 8,212,859 B2 | 7/2012 | Tang et al. |
| 2002/0015008 A1 | 2/2002 | Kishida et al. |
| 2002/0094845 A1 | 7/2002 | Inasaka |
| 2003/0068057 A1 | 4/2003 | Miller et al. |
| 2004/0174605 A1 * | 9/2004 | Olsson ........................ 359/630 |
| 2005/0168438 A1 * | 8/2005 | Casebolt et al. ............. 345/156 |
| 2005/0264527 A1 | 12/2005 | Lin |
| 2006/0007176 A1 * | 1/2006 | Shen ........................... 345/173 |
| 2006/0132382 A1 | 6/2006 | Jannard |
| 2007/0052672 A1 | 3/2007 | Ritter et al. |
| 2008/0088529 A1 | 4/2008 | Tang |
| 2008/0198324 A1 | 8/2008 | Fuziak |
| 2009/0128448 A1 | 5/2009 | Riechel |
| 2009/0153389 A1 | 6/2009 | Kerr et al. |
| 2009/0154719 A1 | 6/2009 | Wulff et al. |
| 2009/0174685 A1 * | 7/2009 | Langella ...................... 345/174 |
| 2009/0180195 A1 | 7/2009 | Cakmakci et al. |
| 2010/0020229 A1 | 1/2010 | Hershey et al. |
| 2010/0033830 A1 | 2/2010 | Yung |
| 2010/0053069 A1 | 3/2010 | Tricoukes et al. |
| 2010/0121480 A1 | 5/2010 | Stelzer et al. |
| 2010/0149073 A1 * | 6/2010 | Chaum et al. .................... 345/8 |
| 2010/0171680 A1 | 7/2010 | Lapidot et al. |
| 2010/0238184 A1 | 9/2010 | Janicki |
| 2010/0271587 A1 | 10/2010 | Pavlopoulos |
| 2010/0277563 A1 | 11/2010 | Gupta et al. |
| 2010/0283711 A1 * | 11/2010 | Sadler ............................. 345/8 |
| 2010/0289817 A1 | 11/2010 | Meier et al. |
| 2011/0001699 A1 | 1/2011 | Jacobsen et al. |
| 2011/0089207 A1 | 4/2011 | Tricoukes et al. |
| 2011/0090135 A1 | 4/2011 | Tricoukes et al. |
| 2011/0214082 A1 | 9/2011 | Osterhout et al. |
| 2011/0221669 A1 | 9/2011 | Shams et al. |
| 2011/0221671 A1 | 9/2011 | King, III et al. |
| 2011/0227812 A1 | 9/2011 | Haddick et al. |
| 2011/0227813 A1 | 9/2011 | Haddick et al. |
| 2011/0254698 A1 | 10/2011 | Eberl et al. |
| 2011/0255050 A1 | 10/2011 | Jannard et al. |
| 2011/0273662 A1 | 11/2011 | Hwang et al. |
| 2012/0013843 A1 | 1/2012 | Jannard |
| 2012/0026071 A1 | 2/2012 | Hamdani et al. |
| 2012/0056846 A1 | 3/2012 | Zaliva |
| 2012/0062445 A1 | 3/2012 | Haddick et al. |
| 2012/0088245 A1 | 4/2012 | Rotter et al. |
| 2012/0105740 A1 | 5/2012 | Jannard et al. |
| 2012/0114131 A1 | 5/2012 | Tricoukes et al. |
| 2012/0188245 A1 | 7/2012 | Hyatt |

FOREIGN PATENT DOCUMENTS

| | | |
|---|---|---|
| WO | WO 00/79327 | 12/2000 |
| WO | WO 2009/076016 | 6/2009 |
| WO | WO 2011/051660 | 5/2011 |
| WO | WO 2012/040386 | 3/2012 |

OTHER PUBLICATIONS

International Preliminary Report on Patentability and Written Opinion, PCT/US2011/023898, date of mailing Aug. 16, 2012, 6 pages.

* cited by examiner

FIG. 4A $d2 \ll d1$ $\therefore C2 \gg C1$

TOUCH SENSOR FOR CONTROLLING EYEWEAR

RELATED APPLICATION(S)

This application claims the benefit of U.S. Provisional Application No. 61/301,865, filed on Feb. 5, 2010. The entire teachings of the above application are incorporated herein by reference.

TECHNICAL FIELD

This application relates to integration of capacitive sensing with head-mounted display (HMD) technology to create a more reliable and more intuitive user control interface.

BACKGROUND

The consumer electronics marketplace has witnessed increasing replacement of traditional switches (pushbutton, toggle, etc.) with capacitive sense technology. One of the most recognized implementations of this technology are gesture based touch-screens such as the Apple iPhone's unlock feature (Apple™ and iPhone™ are trademarks of Apple, Inc. of Cupertino, Calif.). The user simply pushes and slides their finger across the bottom of the screen to unlock the device. That motion is intuitive to figure out. Additionally, the action of doing so is such that it cannot be easily done inadvertently if the device is in one's pocket.

Another example of a capacitive sense toggle switch can be seen on the Sony Playstation 3 (PS3) console system. (Sony™, Playstation™, and PS3™ are trademarks of Sony Corporation of Tokyo, Japan). The on/off power switch and the eject button of the PS3 are both cap sense buttons with logos imprinted on the plastic so the user knows its function.

Capacitive sense technology can also be expanded to proximity sensing. To utilize the iPhone as an example once again, the iPhone senses when it is in close proximity to the users' face during a call. It shuts off the backlight to save power and disables operation off all the buttons so they are not accidentally pressed.

Head-mounted displays (HMDs) and video eyewear provide large format pictures in a small form factor. The HMD is a portable media device and as such the unit is designed to be small and lightweight. A typical HMD connects to a battery pack and another portable device that serves as the video source. The controls for the HMD are normally located on the battery pack itself. The controls can also be placed inline with the cable on a small push-button adapter that will lie somewhere between the person's head (HMD location) and the person's waist (battery pack location).

Another style of HMD design is the stand-alone configuration. In this type there is no cable and no battery pack. Instead, the batteries and controls are located inside or on the HMD itself. This style of HMD typically has push-buttons and slide switches located on the arms. However, the user must memorize the button locations and functions prior to putting on the eyewear or figure it out through trial and error. It is generally not an intuitive design.

SUMMARY OF THE INVENTIONS

As mentioned earlier, current HMD designs that offer controls on the HMD itself typically utilize push-button switches and lack an intuitive nature. Another major consequence of the prior designs is that to actuate the switch requires a significant amount of pressure. This can easily cause the HMD to move and thus disrupt the user's viewing of a video. On the other hand, capacitive sense arrays implemented as discussed herein, require little or no contact depending on the sensitivity of the electrode. The user can lightly press their finger to the plastics to control it and continue to watch the video unhindered.

The utilization of capacitive touch technology on an HMD greatly improves their design by making user control inputs more intuitive.

The capacitive sensor or sensor arrays can be placed on the arms of the HMD in a slider configuration for volume control. The sensed input can be integrated with on screen display to show the volume level, such as while the capacitive array is being pressed. The same concept can be used to control the display brightness, mode, etc.

The relative location of either display can be electronically adjusted to adjust the stereoscopic convergence or correct for a person's IPD (interpupillary distance) preference, such as by touching and sliding a finger on a capacitive array located on the front of the unit. Such an input moves the relative location of the two images electronically.

HMD power can also be controlled by a capacitive sensor arranged in proximity to the user's face. A low power standby mode is entered when the user's face is not present, and a power off mode is entered if the HMD is not used for some period of time. These features save battery life.

To further increase the intuitive nature of capacitive sensor control, their operation can be integrated with an on-screen display. For example, a volume level indication can be displayed as soon as the array is pressed, with adjustment possible after holding the finger on the array for a short period of time. This is desirable so that the user can be sure they are adjusting the proper button. Also, this time delay reduces the risk of inadvertent adjustments being made simply by grabbing the HMD.

Capacitive touch sensors also make button placement much more flexible because the electrodes can be positioned against the outer edge of the plastics when patterned on a flexible board. Therefore the volume control can be made closer to the ear, the brightness control a slider near the display. The designer no longer needs the same rigidity and size that would be required to hold physical moving buttons.

One of the major design metrics for HMDs is the weight of the unit. Using capacitive sense arrays in place of buttons is a definite advantage. The capacitive sense electrodes can be patterned onto a flex circuit which is very light weight. There is nothing mechanical about the array so there is much less worry about the device breaking from improper use or wear-and-tear over time like a normal switch.

Furthermore, interpupillary distance (IPD) is the distance between the centers of one's pupil to the other pupil. This varies a good amount from person to person, with the average adult male having an IPD of 63.5 mm. Typical adjustment methods are mechanical, where the two displays are physically moved by the user. Although this type of control works, it adds weight and complexity to the system adding another mechanism that can break.

With the integration of capacitive sense to a binocular HMD, it is possible to handle IPD adjustment electronically. The user can adjust the IPD to fit his personal preference, providing that there are some extra unused pixels horizontally on either side of the displays to allow for moving the image within it. Providing control to do this by sliding a finger near the display is much more intuitive than having to navigate through a menu system to accomplish the same thing. A pinch and spread motion between the two eyes is also an intuitive way to adjust IPD or even used to zoom in and out of the image is the display processing can handle it. The applications of such sensor arrays to control aspects of the multimedia presented on the HMD are really quite extensive.

At the HMD, it is also possible to utilize capacitive sensor as a proximity sensor. In portable electronics, battery life is extremely important. There is no need to be running the display or backlights if the user has taken the eyewear off or flipped it up into a stowed position. A capacitive sense electrode that is configured to be very sensitive is able to detect the presence of the user's face. This information can be used to enter standby mode if the viewer takes the eyewear off. Eyewear that is designed to flip up and stow without being removed from the user's head can also utilize this proximity sensor to enter standby. To do so the HMD should be mechanically designed to have a ground shield between the capacitive sensor and the user's head only when in the stowed position. The sensor in this design will have similar readings to that of being totally removed. After a prolonged period of standby time the software could shut the entire system off.

The proximity sensor idea can be expanded even further if the device is integrated with an external video player. Once the system enters standby, the HMD can send a message to the player issuing a pause command so that they can pick up right where they left off.

Many of these capacitive sense ideas mentioned in the context of HMDs above can be moved (physically) to an external battery pack electronics and not lose any of the added intuitive functionality. In fact, the battery pack allows for a larger rectangular area to work with when designing the electrodes. A push and hold power switch could replace a common slide switch.

BRIEF DESCRIPTION OF THE DRAWINGS

The foregoing will be apparent from the following more particular description of example embodiments of the invention, as illustrated in the accompanying drawings in which like reference characters refer to the same parts throughout the different views.

The drawings are not necessarily to scale, emphasis instead being placed upon illustrating embodiments of the present invention.

DETAILED DESCRIPTION OF A PREFERRED EMBODIMENT

A description of example embodiments of the invention follows.

Figure 1:
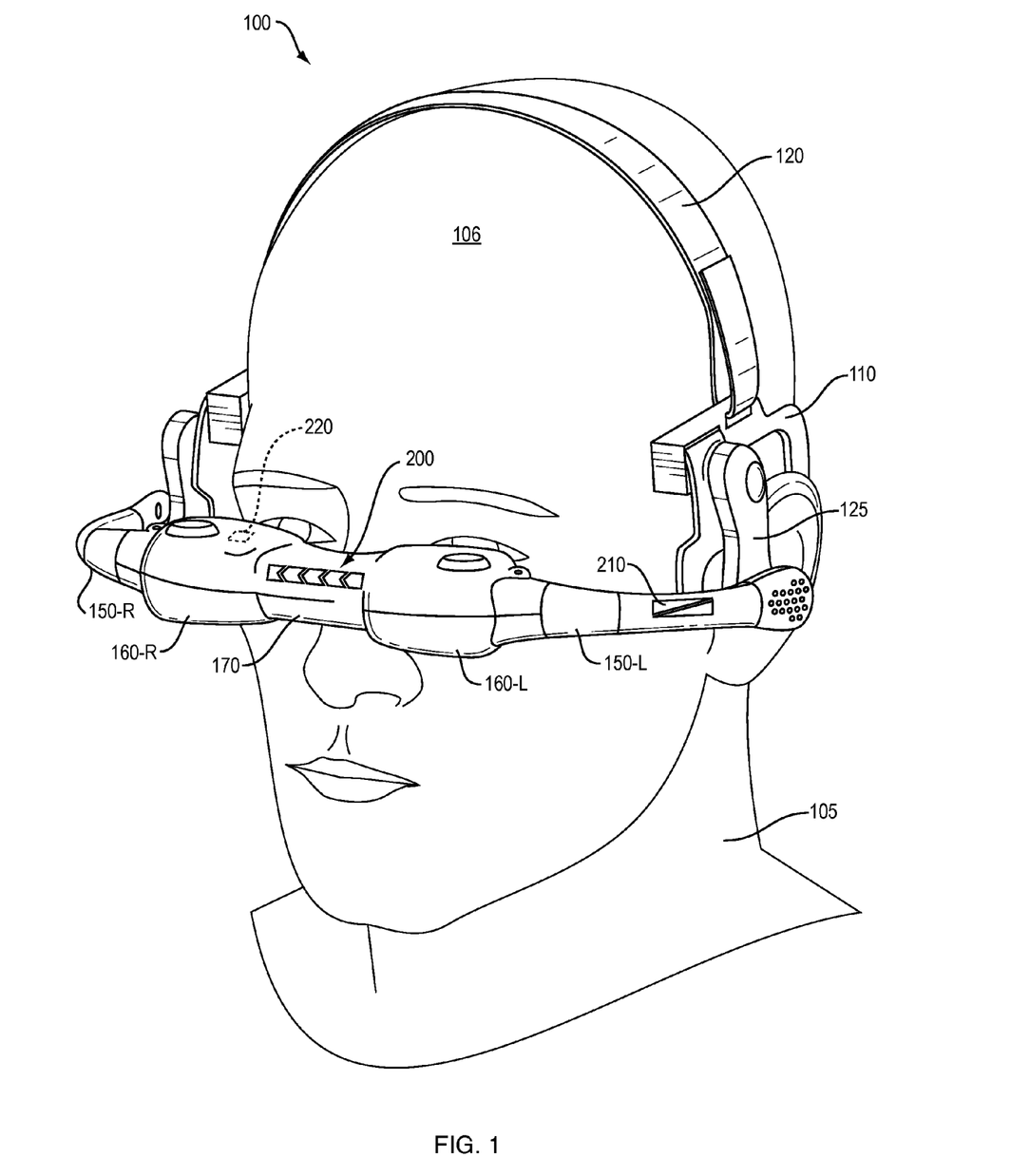
FIG. 1 is a perspective view of a Head Mounted Display (HMD) apparatus as worn by a user.

FIG. 1 is a perspective view of a Head Mounted Display (HMD) 100 that makes use of capacitive touch sensors to implement various functions according to one or more embodiments herein. The HMD apparatus 100 consists of a frame 110 that generally wraps around the back or other portion of a user's head, a strap 120 that generally runs over the top of the user's head, one or more earpieces 125, a left arm 150-L and right arm 150-R, and a bridge portion 170. In the bridge 170 are placed a left microdisplay 160-L and right microdisplay 160-R (not shown in detail in FIG. 1).

Of particular interest to the present embodiment is the use of one or more capacitive touch sensors 200, 210, 220.

A first capacitive sensor 200 is embodied as a capacitive sensor array placed in the bridge area 170. Sensor array 200 is used for adjusting interpupillary distance (IPD) between the two presented images.

A second sensor array 210 is located on the left arm 150-L and is used such as to provide a volume control input.

A third sensor 220 is located in a portion of the HMD 100 that located near the user's 105 face when the HMD is being used.

Figure 2A:
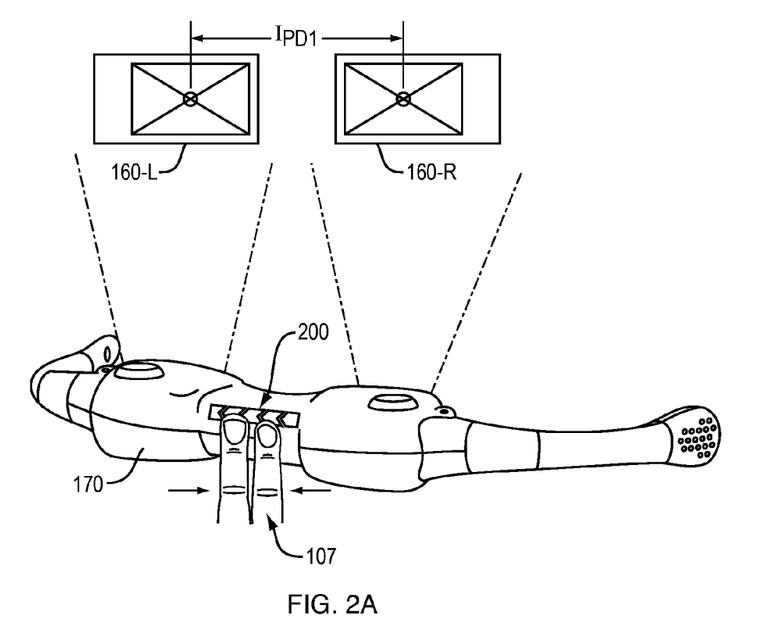
FIGS. 2A and 2B illustrate how capacitive touch sensor may be utilized to control interpupillary distance (IPD) or stereoscopic convergence in the HMD.
Figure 2B:
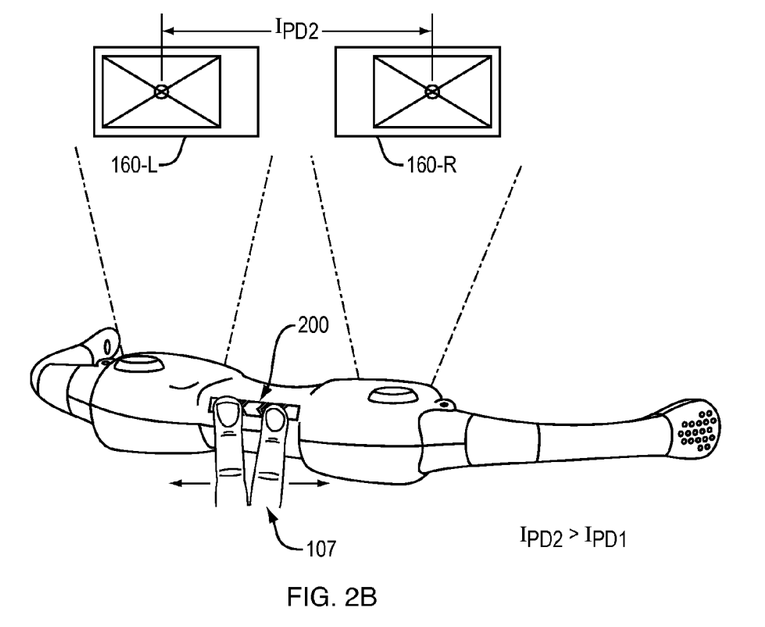

Turning attention to FIGS. 2A and 2B the adjustment of IPD is described in more detail. FIG. 2A is a partial view of a portion of the HMD 100 showing the bridge 170. Above the view of the bridge 170 are two rectangles representing the relative viewports presented to the user 105 on the left display 160-L and right display 160-R, respectively. $IPD_1$ is measured as the distance between the centers of the two relative displays, and can be changed by the user providing an adjustment input via touch sensor 200. The user can provide this input such by taking his fingers 200 and making a squeezing or pinch motion. With this type of input, the interpupillary distance can be reduced.

FIG. 2B shows the use of a different gesture, such as a spreading or pull type movement of fingers 107 on sensors 200. This is interpreted by the capacitive array 200 as an input requesting an increase in the interpupillary distance to $IPD_2$.

Figure 3:
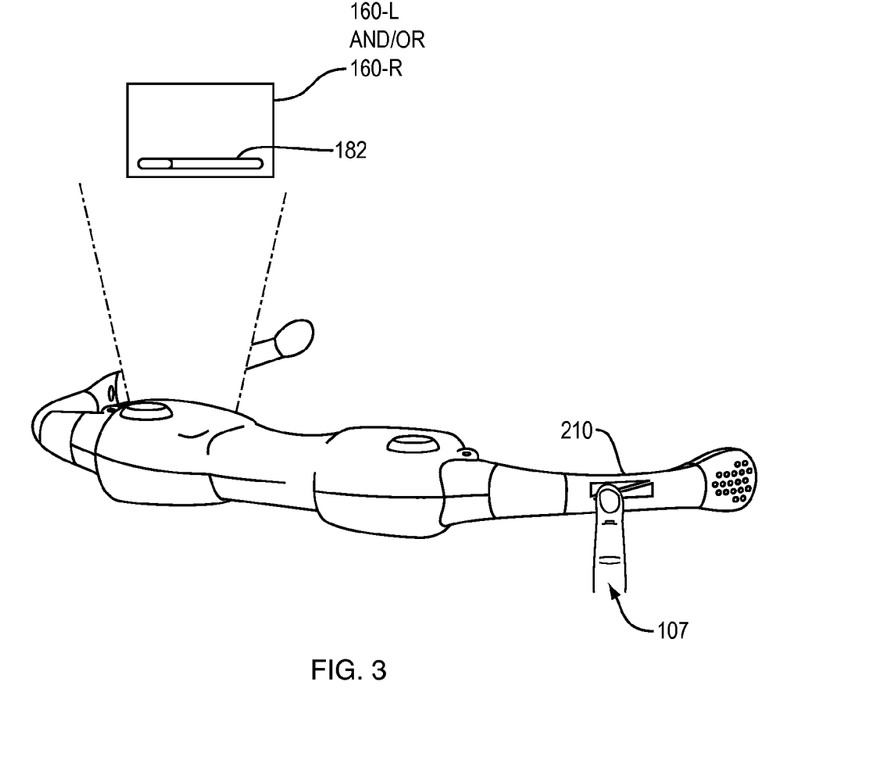
FIG. 3 illustrates how a capacitive touch sensor may be used to control volume in a multimedia presentation.

FIG. 3 shows one use of capacitive sensors 210 to provide volume control. Here the user takes his finger 107 and slides it along the volume control 210 to indicate an increase or decrease in volume of a multimedia presentation such as a movie, video clip, or audio clip. A finger swipe in one direction may indicate a volume decrease and a finger swipe in the other direction a volume increase. In response to this input, a corresponding adjustment is made to the level of volume in the presentation to the user.

Visual feedback can be provided to the user in one of the displays 160-L and/or 160-R, such as by displaying a volume sliding bar 182. The volume bar 182 can be temporarily shown and/or shown only when the user presses their finger 107 against the sensor 210.

Figure 4A:
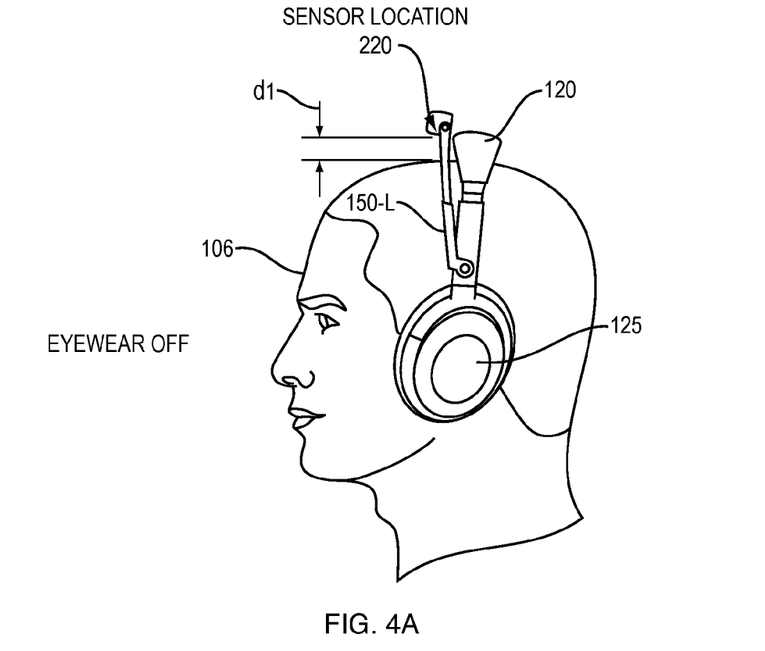
FIGS. 4A and 4B illustrate a proximity sensor used to detect when the HMD is moved away from the user's face.
Figure 4B:
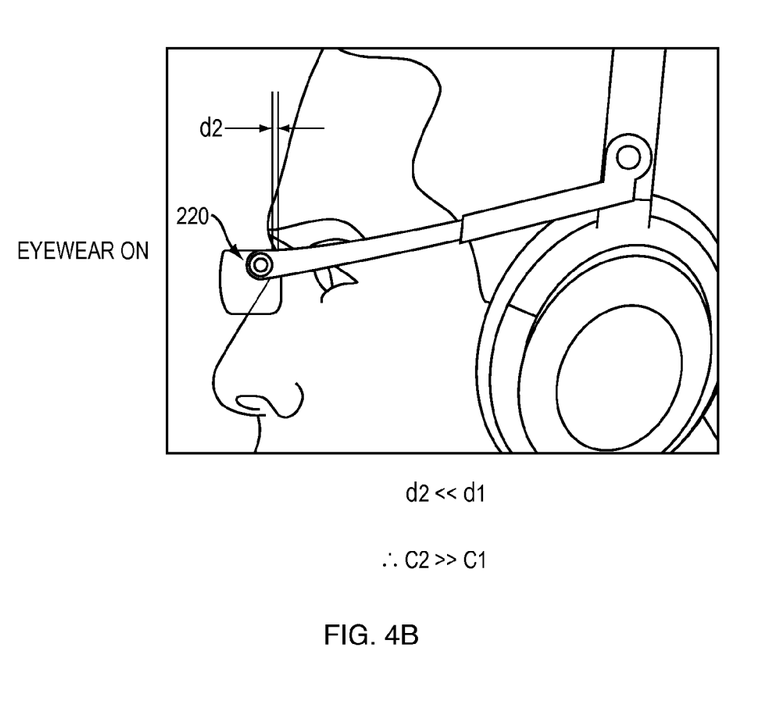

FIG. 4 shows a possible location for one or more other capacitor sensors 220 that are used as user proximity sensors. These sensors 220 are used to detect whether the arm 150-L (or even some other portion of the HMD 100) as located in close proximity to the user's face 106. Thus, for example, as explained above, when the HMD arms are in the raised position as shown in FIG. 4A, the sensor 220 provides a report that the closest object is at least a distance of d1 away, implying that the HMD device 100 has moved away from the head 106. In this position, the HMD 100 may enter a reduced power or power off mode.

When the arms 150 are placed in the lower position (such as shown in FIG. 4B) the sensor 220 reports that the closest object is only a distance of d2 away, and thus that the HMD 100 is now in the active position, proximate to the user's head 106 (and/or eyes). In this position, the HMD 100 may enter a full power on mode.

Figure 5:
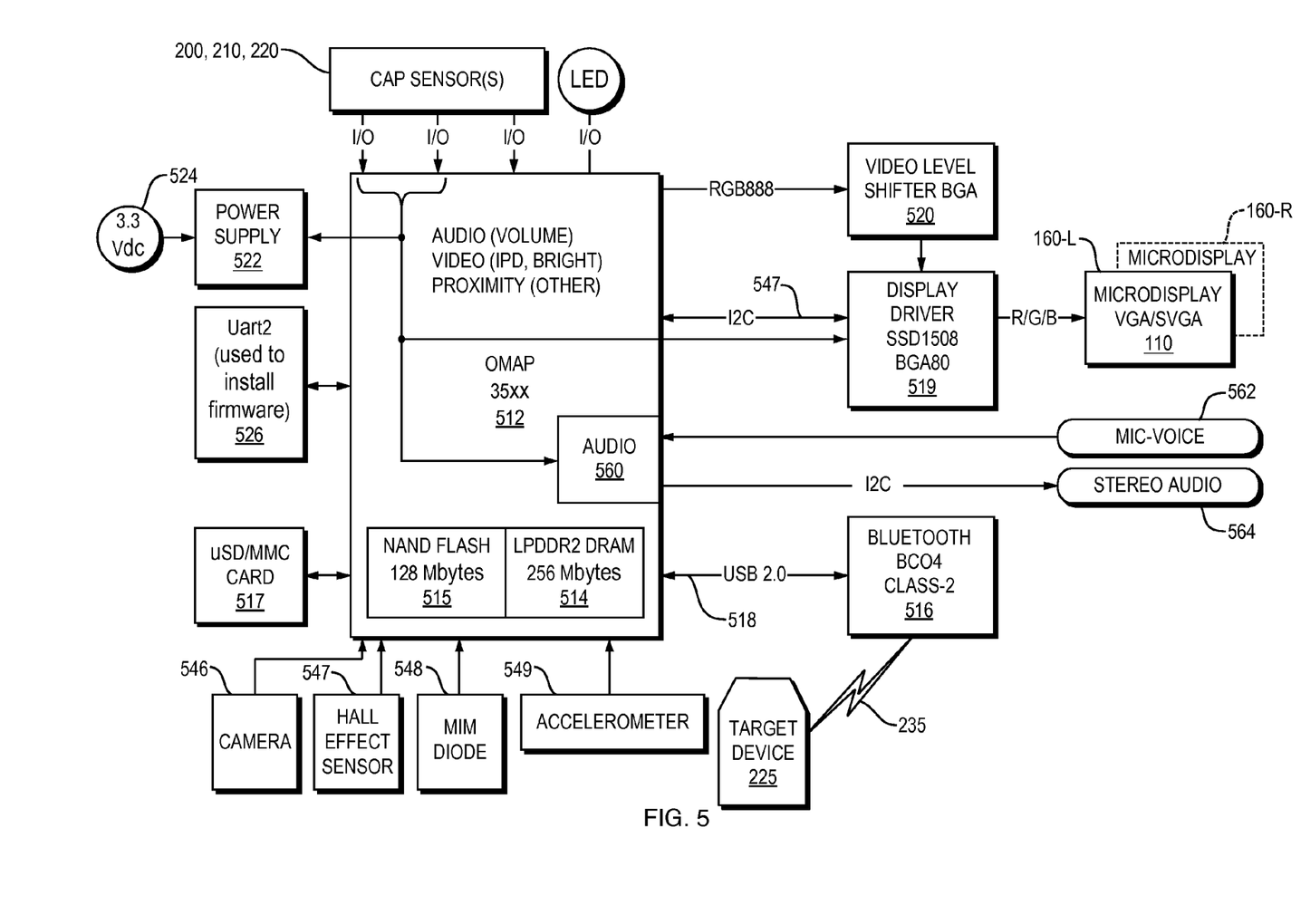
FIG. 5 is a high level block diagram of the electronic components within the HMD illustrating how the capacitive sensors are used to control aspects of a multimedia presentation presented to the user on the microdisplays and through audio.

FIG. 5 provides a more detailed view of the electronic components incorporated into the HMD device 100. In this specific example, the HMD 100 connects to host computing devices (not shown) such as to receive a digital video signal over a wired or wireless connection. These components are described in greater detail in a co-pending patent application U.S. application Ser. No. 12/348,627, filed on Jan. 5, 2009, entitled "Method And Apparatus For Transporting Video Signal Over Bluetooth Wireless Interface", which is incorporated herein by reference.

In the preferred embodiment, the HMD 100 uses an Advanced Reduced instruction set computer (RISC) Machine (ARM)/Digital Signal Processor (DSP) 512 (which may be an Open Multimedia Application Platform (OMAP) 3500 series processor, available from Texas Instruments of Dallas, Tex.), memory 514, Bluetooth interface 516 which may be provided by a Class 2 Bluetooth interface available from Cambridge Silicon Radio (CSR) of Cambridge, England), display driver 519 (which may, for example, be an SSD1508 or other suitable display driver available from Kopin Corporation of Westborough, Mass.), video level shifter circuits 520, a power supply 522 supported by a battery 524, universal receiver transmitters (UART) 526 (such as may be used for debugging) and memory 515. A Secure Digital (SD), eXtreme Digital (xD), USB SD (uSD) memory 517 or other similar interfaces may be used to store application programs, kernel directives, or configuration data, and/or connect to devices such as a digital camera. A number of input device 530 may be associated with the device (e.g., switch 1/switch 2/switch 3 and reset inputs), camera 546, Hall effect sensors 547, MIM diodes 548, accelerometers 549, track pads and scroll wheels, and an LED output 532 (led 1). A pair of VGA or better quality microdisplay elements 160-L, 160-R and audio input and output device(s), which may include microphone input 562 and stereo outputs 564, are also provided.

A video signal to be displayed to the user may be received over a Bluetooth™ wireless communication link 235 established using Serial Port Profile (SPP), as opposed to using any of the "advanced" Bluetooth modes, which provides greater throughput higher than the higher layer protocols imposed by such advanced modes that have been found not to be needed in this application. In the Bluetooth™ radio 516, a video signal received over the Bluetooth™ connection is sent over the USB connection 518 to the processor 512. One design consideration is to optimize data packet format, given known data buffer sizes. Internal to the Bluetooth™ radio 516 is a packet buffer default size of 1000 bytes. This may be modified to force streaming video signals to use only about a 990 byte buffer size. The processor 512 may expect the received video content to be encoded with the H.264 (Motion Picture Experts Group (MPEG)-4 part 10) formatting, using the so-called baseline profile or better.

In a preferred embodiment, the processor 512 may use a multi-tasking embedded operating system. The processor 512 operates on the received video signal as follows. An MPEG format container file (e.g., a .MP4 file) is made available. In one preferred embodiment, this may be a proprietary file format, although the specific details of the input .MP4 file format chosen are not important here, as long as the processor 512 is programmed to correctly process it. The processor 512 then opens a communication port to the host computing device and receives the file over the USB interface 518 from the Bluetooth™ radio 516.

An MP4 decoder in the processor 512 strips the file into respective audio and video streams. More particularly, the processor 512 decodes the input file H.264 compressed digital video signal into a YCbCr baseband component video signal. The processor 512 may also divide the associated compressed audio (formatted as an Advanced Audio Coding (AAC) format signal) into baseband stereo audio.

The processor 512 may output video in any suitable format such as an 8 bit, International Telecommunication Union Radiocommunication Sector (ITU-R) Recommendation BT. 656 or Society of Motion Picture and Television Engineers (SMPTE) 293M 16 bit YUV progressive scan signals with separate sync signals, to the display driver 519. The decompressed video signal is forwarded over an internal ARM bus of the processor 512. The ARM bus then sends the content directly to the display driver 519 via the SMPTE 293M interface. The Intelligent Interface Controller (I2C) interface 547 is used to configure the microdisplay elements 160. The processor 512 also outputs the baseband audio to the audio output Compression/Decompression Module (CODEC) 560. It may take mono or stereo audio input and produce suitable stereo output signals.

Also shown here are the connections of the capacitive sensors 200, 210, 220 to the processor 512. These sensors, as explained above, are used to control a volume for the audio output 564, aspects of the video presentation aspects such as IPD, stereoscopic convergence, or brightness, or control over the operation of the HMD in response to proximity of the user's face. These inputs are then used by the audio circuits 560 and/or display drivers 519 and/or power supply 522 for corresponding control.

Figure 6:
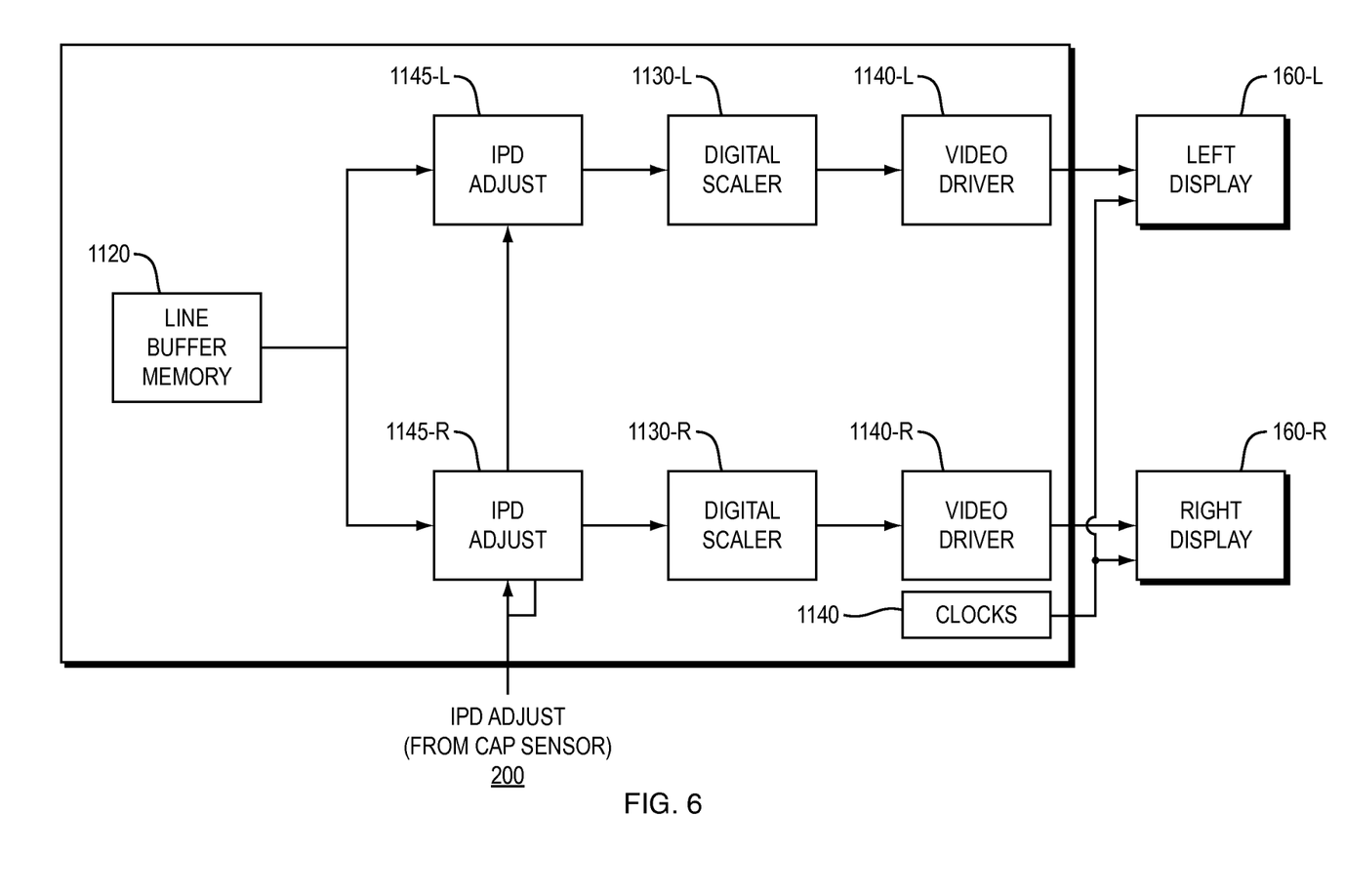
FIG. 6 is a more detailed view of an IPD adjust function.

FIG. 6 is a more detailed view of portions of the OMAP processor 512 and video display driver(s) of FIG. 5. The line buffer 1120 may be implemented as a single buffer, a double buffer, or a pair of FIFOs. The buffer 1120, of whatever design, is often small enough to fit in an FPGA or similar programmable logic device, and may be integrated with other components of the display control logic.

In this example embodiment, there are a total of six digital scalers 1130 used (one each for the R, G, B channels for each of the left and right displays), since interpolation of each color channel is preferably done separately from the other channels. Digital scalers 1130 "make up" the difference in horizontal resolution between the higher resolution display and now lower resolution input signal fed to each eye. Digital scalers 1130 can be implemented as a simple repetition of pixels in the horizontal resolution of the input video stream and the two displays 160. In a case where the scale factor is a simple integer reciprocal (such as 2:1), scaling 1130 can be implemented as a simple repetition of pixels. However, in other cases, where the scale factor is not an integer reciprocal, more complicated scaling techniques such as linear interpolation may be used. In either case, scalers 1130 are preferably implemented in the digital domain, such as by the OMAP 512, which may achieve better results than possible with the prior art methods of resampling an analog signal.

Some example considerations for the digital scalers 1130 include the following:

A standard 2D video stream at 480p resolution is typically encoded with 720 active, "non-square" pixels per horizontal line. For the 3D "side-by-side" input video stream format, there are then 360 pixels available for each eye. The appropriate scaling ratio is slightly greater than in this case (2:1), if the images are cropped for presentation on a pair of wide VGA (WVGA) (864×480) displays. Consider first that some pixels may be omitted from the input stream. For example, SMPTE RP-187 specifies a clean aperture 708 pixels wide, of 720 available. In practice, a 704-pixel aperture is commonly used, which in the side-by-side format results in 352 of 360 pixels being available for each of the left and right input streams. In addition, it is possible that, say, only 854 of the 864 pixels in each output display 150 are available. In that case, the horizontal aspect ratio implemented by scalers 130 aspect ratio might be 854/352 or about 80/33, slightly greater than (2:1).

In another implementation, the input video stream is a 720p resolution color video signal with 1280 active square pixels per horizontal line. When 3D "side-by-side" stereo encoding is used with this input video stream, an exact (2:1) scaling ratio is appropriate for driving two 640×720 half input images, to a corresponding pair of 1280×720 displays. In this example, all pixels are available in both the input stream and on the display.

Also using the standard 1280×720p format, a horizontal scaling ratio of 4:3 may be used to prepare two half images of (approximate) size 854×720. If vertical scaling by 2:3 is also performed, then the 854×480 output may be displayed on a pair of wide VGA displays.

A simple method of vertical scaling is line skipping, which in this case would skip every third line to produce 2 output lines for every three input lines. The resulting image artifacts may be unacceptable in many applications. However, an advantage of line skipping over other methods is that it does not require additional memory.

Better scaling results may be obtained by interpolating between successive lines, or by higher-order spatial filtering over multiple lines. In this case the line buffer of FIG. 5 would be expanded to accommodate multiple lines. The same memory may be used for both the horizontal and vertical scaling.

The standard 1080p video format has 1920 active square pixels per horizontal line. When a 3D "side-by-side" stereo is used with this type of input signal, a (2:1) scaling ratio is also appropriate for driving the two 960×1080 half images to a pair of 1920×1080 displays.

After undergoing any necessary scaling by scalers 1130-L, 1130-R, the output streams pass to the left and right video display drivers 1140-L and 1140-R. Each display driver 1140 typically includes one or more D/A converters and one or more video amplifiers.

In an embodiment, the system may implement a 3D viewing mode that can be selectively switched to a 2D mode by changing the scaling factor in the digital scalers 1130. That is, instead of applying interpolation, the same buffer output, without scaling, is sent to each display 160-L, 160-R.

Soft IPD and Convergence Adjust

In another implementation, the HMD 100 may be adapted to provide soft Inter-Pupilliary Distance (IPD) or convergence adjustments.

In particular, it is not uncommon for the available resolution of the physical displays 160 to exceed that of the presented image in the input video stream. For example "wide VGA" displays such as the Kopin CyberDisplay® WVGA mentioned above may have up to 864 active columns, but are often used to display content with horizontal resolutions of only 854, 768, 720, or 640 pixels. In these situations, the drive electronics 100 will typically center the active image horizontally and drive the inactive "side" pixel columns to black. However, by varying the size of the resulting left and right black borders (refer back to FIG. 2), the relative position of the image can be electronically moved horizontally within the active pixel array.

Because the HMD provides independent video signals to the two displays, it is possible to control the border sizes on left and right displays independently. For example, moving the left image to the right and the right image to the left would change the stereoscopic convergence and make the image appear closer to the user. In this way, the convergence of the stereoscopic images may be adjusted for optimal viewing via electronic controls, without requiring mechanical adjustments to the display or lens position. Such adjustments may be desirable to accommodate variations in the video source material or in the viewer's Interpupilliary Distance (IPD). This can then affect the 3D depth perceived by the viewer.

Figure 7:
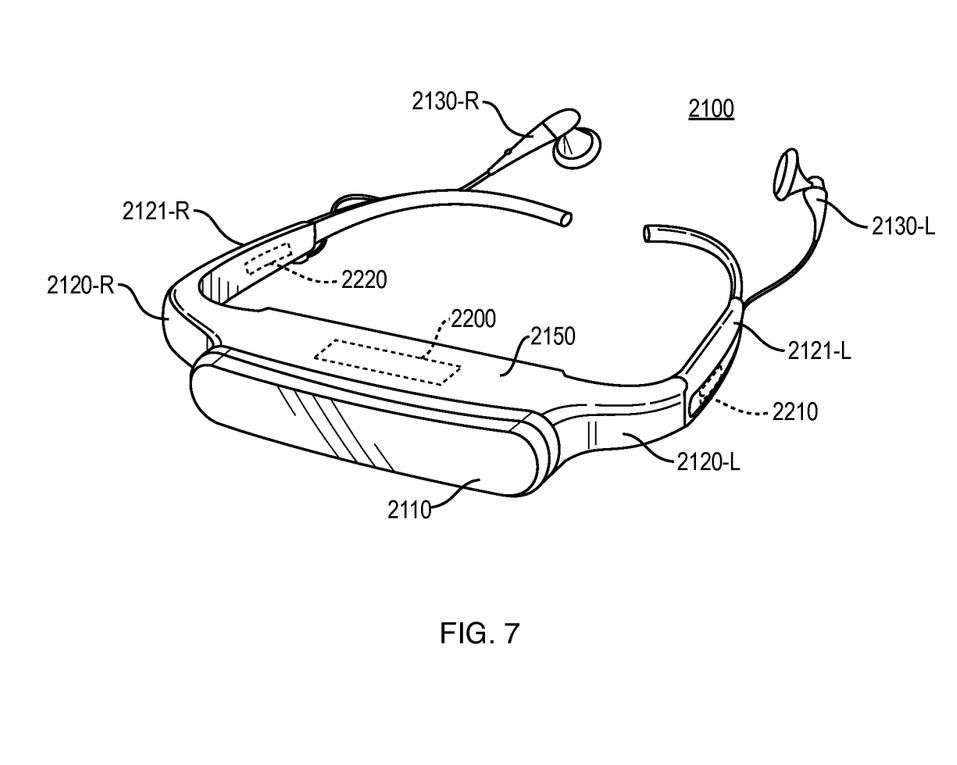
FIG. 7 is an alternative type of eyewear device showing other locations for the sensors.

In such an embodiment, as shown in FIG. 7, IPD adjustment 1145-L, 1145-R can be applied by shifting horizontal line of pixels for the left and right eye with respect to one another. The user may be provided with an input to control the amount of IPD shift via the capacitive touch sensor array 200 as described above.

It should be understood that the stereoscopic convergence or IPD adjustment need not depend on a particular scale factor, and indeed can be applied to other 2D or 3D video eyewear systems such as the systems that do not apply scale factors at all. The horizontal shift may be performed before or after scalers 1130-L, 1130-R such as by changing the address from which the digital scalers 1130-L, 1130-R read from the line buffer memory 1120 (as shown in FIG. 6) or by shifting the pixels in each eye after they are output by the scalers 1130-L, 1130-R. As long as such systems produce separate video input streams for the left and right displays, the adjustment technique can be used.

It should now be appreciated that the specific physical form of the HMD 100 in FIG. 1 is not a necessary requirement for taking advantage of the novel features described herein. For example, FIG. 7 shows an alternative arrangement where a video eyewear device 2100 uses sensors 2200 and 2220 formed in an upper temple portion and in an arm portion, such as to control IPD and volume only.

Figure 8:
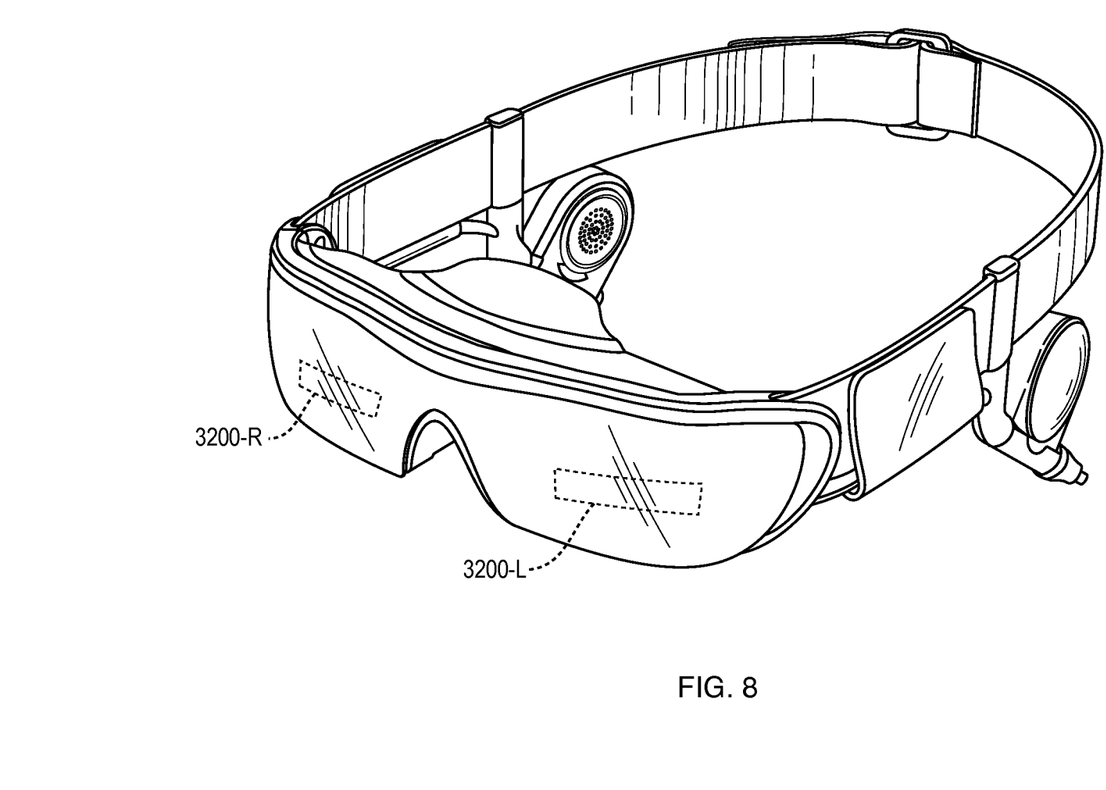
FIG. 8 is a still other embodiment where the touch sensors are placed in the front portion of an eyewear device.

Likewise, sensors 3200-L and 3200-R may be embedded in a plastic external eyepiece of another type of eyewear device as shown in FIG. 8.

Many of the above ideas may also apply to capacitive touch sensors located on other portions of different types of HMDs, such as those that may have an external battery pack. Since the battery pack presents a large surface area it is possible to implement the touch sensors there.

The teachings of all patents, published applications and references cited herein are incorporated by reference in their entirety.

While this invention has been particularly shown and described with references to example embodiments thereof, it will be understood by those skilled in the art that various changes in form and details may be made therein without departing from the scope of the invention encompassed by the appended claims.

What is claimed is:

1. A video eyewear device comprising:
    a receiver, disposed in a head-mounted housing, for receiving an input signal having encoded therein video and audio information representing a multimedia presentation;
    a first microdisplay coupled to the head-mounted housing using a first arm, the first microdisplay and first arm arranged to occlude a field of view of a user, the first microdisplay including a first screen arranged to be viewed directly by the user, the first screen being opaque;
    a speaker coupled to the head-mounted housing;

a video driver circuit disposed in the head-mounted housing and receiving the input signal, and the video driver circuit providing a video portion of the multimedia presentation to the first microdisplay;

an audio driver circuit receiving the input signal and providing an audio portion of the multimedia presentation to the speaker;

a capacitive sense array formed of at least two capacitive touch sensors, each capacitive touch sensor patterned onto a flexible circuit and disposed in the head-mounted housing, the capacitive touch sensor receiving a user input at one of a location closer to the speaker to control rendering of the audio portion through the speaker and at a location closer to the microdisplay to control display of the video portion through the first screen, and the capacitive sense array providing in response to said user input a control signal to at least one of the video driver circuit or audio driver circuit, the control signal for controlling directly, without menu navigation, an aspect of the multimedia presentation on the video eyewear device, wherein the capacitive sense array enables a user to intuitively control the first microdisplay and the speaker as a function of location of user input relative to the speaker and the microdisplay, while continuing to watch the multimedia presentation unhindered; and a second microdisplay coupled to the head-mounted housing using a second arm, the second microdisplay and second arm arranged to occlude a second field of view of a user, the second microdisplay including a second screen arranged to be viewed directly by the user, the second screen being opaque;

wherein the video driver circuit further provides a video portion of the multimedia presentation to the second microdisplay; and wherein the user input is applied to adjust a relative offset between video signals presented on the first and second microdisplays.

2. The apparatus of claim 1 wherein the user input is a volume control applied to control a volume level of an audio signal to the speaker indicative of the audio portion of the multimedia presentation.

3. The apparatus of claim 2 additionally wherein the user input causes a corresponding image of a volume level to appear in the microdisplay.

4. The apparatus of claim 1 wherein the user input is a video control applied to control a brightness or contrast of the multimedia presentation.

5. The apparatus of claim 1 wherein the user input is a power control signal to control power applied to one or more components of the video eyewear device.

6. The apparatus of claim 1 wherein a pinch motion input received by one of the capacitive touch sensors at a location close to the first and second microdisplays is used to reduce the relative offset.

7. The apparatus of claim 6 wherein a spread motion input on the one capacitive touch sensor is used to increase the relative offset.

8. A video eyewear device comprising:
a microdisplay;
a frame supporting the microdisplay and a speaker, the frame supporting the microdisplay in a position near a user's face, the frame being head-worn and incorporating a video driver circuit, an audio driver circuit, a capacitive proximity sensor, and a capacitive sense array, and the frame having an arm coupling to the microdisplay, the microdisplay and the arm arranged to occlude a field of view of a user, the microdisplay including a screen arranged to be viewed directly by the user, the screen being opaque;

the capacitive proximity sensor, for sensing proximity of the device near the user's face, and in response thereto, controlling application of power to at least one of the video driver circuit or the microdisplay;

the capacitive sense array formed of at least two capacitive touch sensors, each capacitive touch sensor patterned onto a flexible circuit and disposed in the frame, the capacitive touch sensor receiving a user input at one of a location closer to the speaker to control rendering of an audio portion of a multimedia presentation through a speaker and at a location closer to the microdisplay to control display of a video portion of the multimedia presentation through the screen, and the capacitive sense array providing in response to said user input a control signal to at least one of the video driver circuit or audio driver circuit, the control signal for controlling directly, without menu navigation, an aspect of the multimedia presentation on the video eyewear device, wherein the capacitive sense array enables a user to intuitively control the microdisplay and the speaker as a function of location of user input relative to the speaker and the microdisplay, while continuing to watch the multimedia presentation unhindered; and a second microdisplay coupled to a head-mounted housing using a second arm, the second microdisplay and the second arm arranged to occlude a field of view of a user, the second microdisplay including a second screen arranged to be viewed directly by the user, the second screen being opaque;

wherein the video driver circuit further provides the video portion of the multimedia presentation to the second microdisplay; and wherein the user input is applied to adjust a relative offset between video signals presented on the first and second microdisplays.

9. The device of claim 8 wherein the user input is a volume control applied to control a volume level of an audio signal to the speaker.

10. The device of claim 9 additionally wherein the user input causes a corresponding image of a volume level to appear in the microdisplay.

11. The device of claim 8 wherein the user input is a video control applied to control a brightness or contrast of the multimedia presentation.

12. The device of claim 8 wherein the user input is a power control signal to control power applied to one or more components of the video eyewear device.

* * * * *